US00RE38889E

(19) United States
(12) Reissued Patent
Inoue

(10) Patent Number: US RE38,889 E
(45) Date of Reissued Patent: Nov. 22, 2005

(54) PITCH PERIOD EXTRACTING APPARATUS OF SPEECH SIGNAL

(75) Inventor: Takeo Inoue, Osaka (JP)

(73) Assignee: Sanyo Electric Co., Ltd., Moriguchi (JP)

(21) Appl. No.: 09/685,938

(22) Filed: Oct. 6, 2000

Related U.S. Patent Documents

Reissue of:
(64) Patent No.: 5,819,209
Issued: Oct. 6, 1998
Appl. No.: 08/447,646
Filed: May 23, 1995

(30) Foreign Application Priority Data

May 23, 1994 (JP) ..... 6-108544

(51) Int. Cl.[7] ..... G10L 3/02; G10L 9/00
(52) U.S. Cl. ..... 704/207; 704/208; 704/216; 704/217; 704/218
(58) Field of Search ..... 704/207, 208, 704/216–218

(56) References Cited

U.S. PATENT DOCUMENTS 4,653,098 A * 3/1987 Nakata et al. ..... 704/207

OTHER PUBLICATIONS

Rabiner L.R. Schafer RW, Digital Processing of Speech Signals, Jun. 1978, pp. 146–156.*

Lawrence R. Rabiner and Ronald W. Schafer, Digital Processing of Speech Signals, Prentice–Hall, Inc., 1978, 12 pages.*

* cited by examiner

*Primary Examiner*—David D. Knepper
(74) *Attorney, Agent, or Firm*—Darby & Darby

(57) ABSTRACT

A pitch period extracting apparatus includes a microcomputer which determines a sampling frequency for an A/D converter, and a range of delay times for calculating autocorrelative values on the basis of the sampling frequency. For example, the delay times are set within a range of 20 samples≦k≦100 samples in a case of 8 kHz, and a range of 15 samples≦k≦75 samples in a case of 6 kHz. The microcomputer calculates the autocorrelative values of speech signal data stored in a buffer memory, and outputs a delay time at which a maximum autocorrelative value is obtainable as a pitch period of an inputted speech signal.

18 Claims, 3 Drawing Sheets

FIG. 5
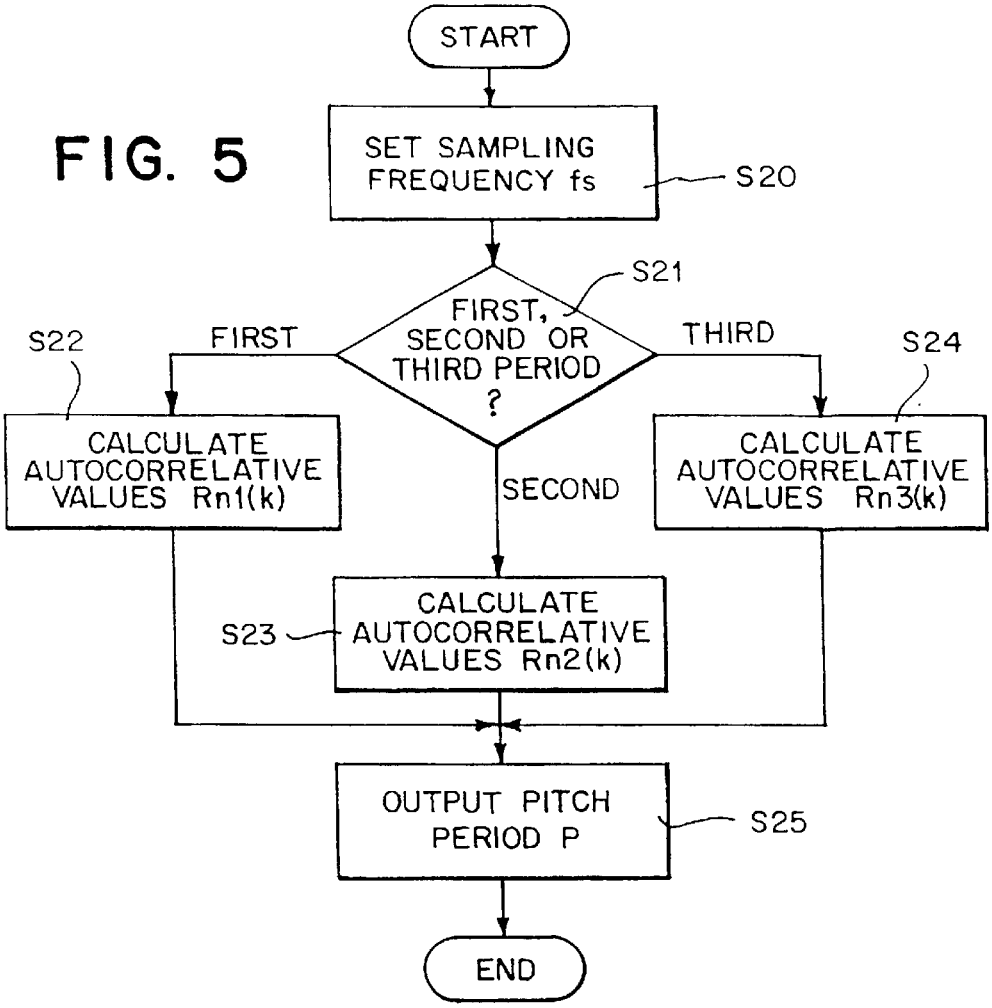
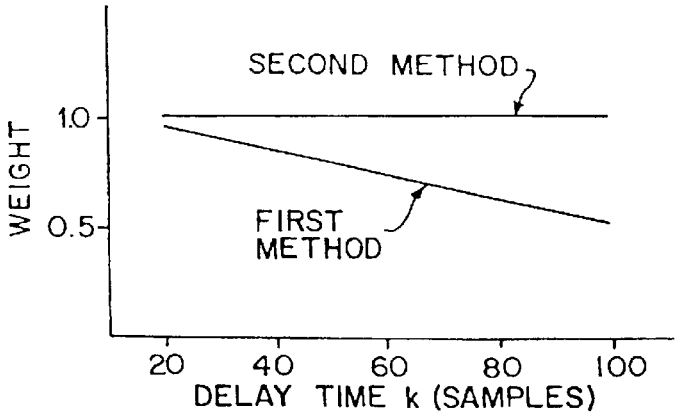
FIG. 6

PITCH PERIOD EXTRACTING APPARATUS OF SPEECH SIGNAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a pitch period extracting apparatus of a speech signal. More specifically, the present invention relates to a pitch period extracting apparatus which extracts a pitch period of an inputted speech signal by evaluating a delay time at which a maximum autocorrelative value is obtainable.

2. Description of the Prior Art

As methods for extracting a pitch period of a speech signal with utilizing autocorrelative values, two methods are known. A first method is a method utilizing a short-time autocorrelation, and a second method is a method utilizing a modified short-time autocorrelation.

In the first method, it is assumed that the speech signal in restricted in time, and autocorrelative values are evaluated by regarding as that the speech signal exists within only a period of a time length Ts and the speech signal is always zero out of the period. In the second method, it is assumed that the speech signal is not restricted in time, and autocorrelative values between a period of a time length Tt and a period determined by delaying the period of the time length Tt within a range in which a presence of a pitch period is assumed.

Now, if a waveform of an inputted speech signal is represented by digital speech data x(n), the short-time autocorrelative value Rn(k) in the first method is given by the following equation (1).

$$Rn(k) = \sum_{m=0}^{Ts-1-k} x(n+m)\cdot x(n+m+k) \quad (1)$$

$$m = 0, 1, 2, \ldots, Ts-1-k$$

In the equation (1), "Ts" indicates a time period in which a presence of the speech signal is assumed, and "k" is a delay time for delaying the speech signal waveform in calculating the short-time autocorrelative value Rn(k).

Furthermore, the modified short-time auto correlative value R'n(k) in the second method is given by the following equation (2).

$$R'n(k) = \sum_{m=0}^{Tt-1} x(n+m)\cdot x(n+m+k) \quad (1)$$

$$m = 0, 1, 2, \ldots, Tt-1$$

In addition, in the equation (2), "k" is a delay time for delaying a speech signal waveform in calculating the short-time autocorrelative value R'n(k), and having a relationship of Ts>Tt>>k.

As well seen from the equations (1) and (2), in the first method, a range in which a product sum is calculated in evaluating the autocorrelative value (hereinafter, may be called as "product sum range") is decreased according to an increase of the delay time k, and in contrast, in the second method, the product sum range is constant irrespective of the delay time k.

FIG. 6 is a graph showing a relationship of weights in the first method and the second method, and an axis of abscissa indicates a delay time k (samples), and an axis of ordinate indicates a rate of the weights with respect to the autocorrelative values. In addition, in the first method, the time length Ts is set as Ts=200 samples, for example. As seen from FIG. 6, it is understood that the autocorrelative values having the longer period, the smaller weight in the first method, but in the second method, the autocorrelative values are evenly weighted irrespective of the period.

Therefore, there is not a possibility that double a true pitch period is erroneously evaluated as a pitch period in the first method; however, in the second method, there is a possibility that double a true pitch period is erroneously evaluated as a pitch period. That is, in comparison with the second method, the first method is advantageous in a point of an accuracy of a pitch period.

However, in comparison with the second method, the first method is disadvantageous in a point of a processing time. More specifically, in the first method, the autocorrelative values are weighted with extremely large weights when a pitch period is short, while the autocorrelative values are weighted with extremely small weights when a pitch period is long. Therefore, in the case of a long pitch period, it is necessary to prevent the autocorrelative value from becoming to be smaller than autocorrelative value having a short period which is not a pitch period. Accordingly, in the first method, in order to calculate a pitch period with precision, it is necessary to set the time period Ts at a degree of a time length of at least double a possible longest pitch period (k=100 in FIG. 6). Therefore, in the first method, there is a disadvantage that the processing time becomes long. In contrast, in the second method, since the weights are constant irrespective of the pitch period, the time length Tt may be set at a degree of a time length equal to a pitch period, and therefore, the processing time is short.

In other words, in the first method, there is an advantage that it is possible to extract a pitch period with precision but a disadvantage that the processing time is long, and in the second method, there is an advantage that the processing time is short but a disadvantage that there is a possibility that an erroneous pitch period is extracted.

SUMMARY OF THE INVENTION

Therefore, a principal object of the present invention is to provide a novel pitch period extracting apparatus of a speech signal.

Another object of the present invention in to provide a pitch period extracting apparatus in which it is possible to accurately extract a pitch period with a short processing time.

A pitch period extracting apparatus according to the present invention comprises: an A/D converter for converting a speech signal into speech signal data with a sampling frequency; a memory for storing the speech signal data outputted from the A/D converter; an autocorrelative value calculating means for calculating autocorrelative values of the speech signal data stored in the memory on the basis of delay times of the speech signal data; a delay time range determining means for determining a range of the delay times on the basis of the sampling frequency; and a pitch period detecting means for detecting a pitch period of the speech signal by evaluating a maximum value out of the autocorrelative values.

The delay time range determining means determines the delay times in calculating the autocorrelative values by the autocorrelative value calculating means on the basis of information of the sampling frequency. Therefore, it is possible to most suitably set the range of the delay times for extracting the pitch period. Therefore, according to the present invention, it is possible to calculate the pitch period with accuracy and it is possible to prevent a calculation amount from being increased.

In an aspect of the present invention, the pitch period extracting apparatus further comprises a period setting means for setting a plurality of periods within the range of the delay times determined by the delay time range determining means, and a product sum range control means. In a case where the sampling frequency is 8 kHz, the above described delay time range determining means determines the range of 20 samples≦k≦100 samples, and the range of 15 samples≦k≦75 samples in a case where the sampling frequency is 6 kHz. Then, the period setting means sets periods of 20≦k≦40, 40≦k≦80 and 80 ≦k≦100, as a fist period, a second period and a third period in a case of 8 kHz. In a case of 6 kHz, periods of 15≦k<30, 30≦k<60 and 60≦k≦75 are respectively set as a first period, a second period and a third period.

In such a case, the period setting means preferably sets a starting value and an end value of each of the first, second and third periods in a manner that the end value does not include double the starting value.

Furthermore, the product sum range control means controls product sum ranges in respectively evaluating the autocorrelative values in the first, second and third periods. Specifically, the product sum range control means makes the product sum ranges for the first period, the second period and the third period sequentially shorter in this order, whereby the autocorrelative values of the respective periods can be weighted with weights different from each other.

Then, the pitch period detecting means evaluates a maximum value out of the autocorrelative values of the respective periods, and detects a pitch period equal to a delay time at which the maximum value is obtained.

In accordance with the present invention, even if a pitch period is short, the autocorrelative values are not weighted with extremely large weights, and therefore, the range of delay times in calculating the autocorrelative values may be narrow in comparison with the conventional first method. Therefore, a time for calculating the autocorrelative values becomes short, and a memory capacity necessary for calculating the autocorrelative values can be reduced.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart showing an operation of a third embodiment; and

FIG. 6 is a graph showing a relationship between a pitch period and weights in a first method and a second method of the prior art.

DETAILED DESCRIPTION OF THE PREFERRED EMBODIMENTS

Figure 1:
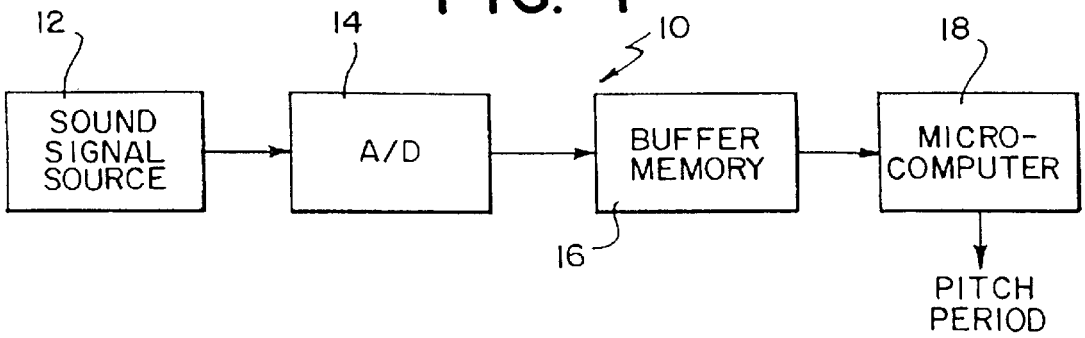
FIG. 1 is a block diagram showing one embodiment according to the present invention.

A pitch period extracting apparatus 10 of this embodiment shown in FIG. 1 includes a speech signal source 12 such as a microphone, speech signal output circuit and etc., and an analog speech signal x(t) from the speech signal source 12 is sampled by an A/D converter 14 and converted into a digital speech signal or speech signal data x(n). In this embodiment shown, a sampling frequency fs of the A/D converter L4 is set at 8 kHz or 8 kHz, for example. The speech signal data x(n) from the ND converter 14 is temporarily stored in a buffer memory 16. A microcomputer 18 calculates autocorrelative values Rn(k) of the speech signal data x(n) stores in the buffer memory 16.

Delay times k in calculating the autocorrelative values Rn(k) are determined by the microcomputer 18 according to information of the sampling frequency fs of the A/D converter 14. Then, the microcomputer 18 evaluates a maximum value out of the autocorrelative values Rn(k) of the speech signal data x(n), and a delay time k at which the maximum value is obtained is outputted as a pitch period P of the analog speech signal x(t). A pitch period of a speech signal is normally approximately 80–400 Hz, and it is possible to almost cover a speech signal generated by human beings by this range. For example, if the sampling frequency of the A/D converter 14 is 8 kHz, a range within which the autocorrelative values Rn(k) are calculated, that is, a range of the delay time k is set as 20 samples≦k≦100 samples. Furthermore, if the sampling frequency is 6 kHz, for example, the range of the delay times k for calculating the auto correlative values Rn(k) is set 15 samples≦k≦75 samples. In addition, the numbers of the samples are calculated according to fs/400–fs/80.

Figure 2:
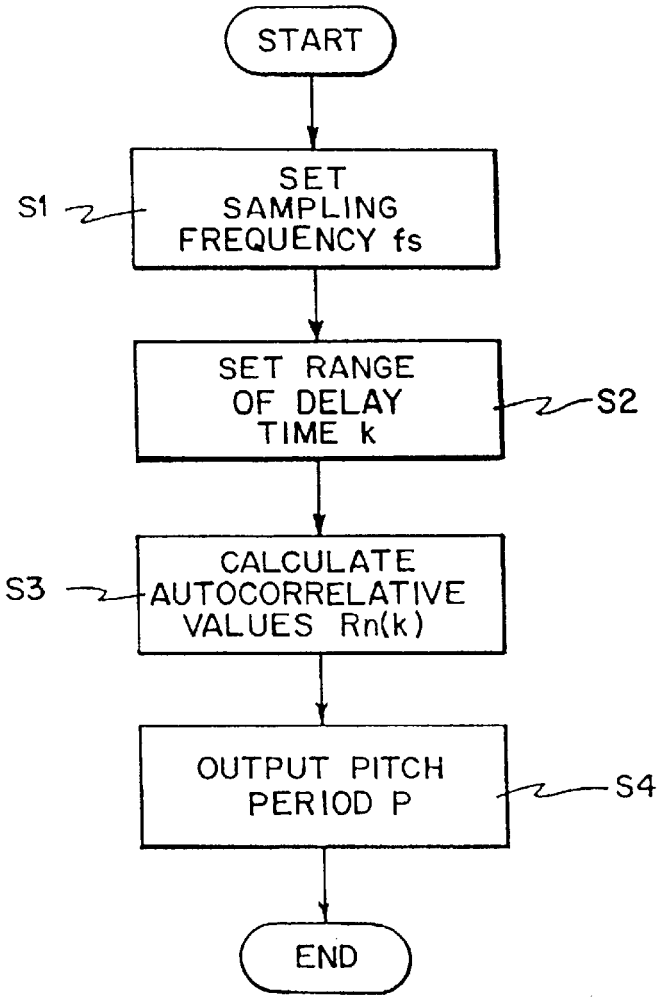
FIG. 2 is a flowchart showing an operation of a first embodiment.

With referring to FIG. 2, in a first embodiment, the microcomputer 16 set the sampling frequency fs of the A/D converter 14, 8 kHz or 6 kHz, in a first step S1. According to the sampling frequency fs thus determined, the AID converter 14 converts the analog speech signal x(t) into speech signal data x(n). In a next step S2, the microcomputer 18 determines delay times k with referring to data of the sampling frequency fs in the first step S1. That is, in a case of the sampling frequency is 8 kHz, the microcomputer 18 sets the delay times k in the range of 20 samples≦k≦100 samples. In a case where the sampling frequency is 6 kHz, the microcomputer 18 sets the delay times k in the range of 15 samples≦k≦75 samples.

Then, in a step S3, the microcomputer 18 sequentially reads-out the speech signal data x(n) stored in the buffer memory 16, and calculates the autocorrelative values Rn(k) on the basis of the following equation (3) and according to the delay times k set in the step S2.

$$Rn(k) = \sum_{m=0}^{T} x(n+m) \cdot x(n+m+k) \tag{3}$$

$$m = 0, 1, 2, \ldots, T$$

$$6\ \text{kHz}: 15 \leqq k \leqq 75$$

$$8\ \text{kHz}: 20 \leqq k \leqq 100$$

More specifically, the microcomputer 18 calculates, in the product sum range represented by "T" in the equation (3), autocorrelative values Rn(20), Rn(21), . . . Rn(99) and Rn(100) when the sampling frequency fs is 8 kHz, or autocorrelative values Rn(15), Rn(16), . . . Rn(74), and Rn(75) when the sampling frequency fs in 6 kHz. Then, in a step S4, the microcomputer 18 evaluates a maximum value out of the autocorrelative values Rn(k) calculated in the step S3, and outputs a delay time k at which the maximum value is evaluated as a pitch period P of the inputted speech signal x(t).

In the second embodiment, the microcomputer 18 sets a most suitable range of the delay times k according to the sampling frequency fs. In contrast, in FIG. 3 embodiment, the microcomputer 18 sets a plurality of periods within the range of the delay times k in calculating the autocorrelative values Rn(k), More specifically, in this embodiment shown, the microcomputer 18 divides the range of the delay times k which is a pitch period searching time period in calculating the autocorrelative values Rn(k) into a plurality of periods. In such a case, respective starting values and end values of the respective periods are determined such that the end value of the period does not include double the starting value of that period. Then, autocorrelative values Rn1(k), Rn2(k) and Rn3(k) of the respective periods are calculated.

Figure 3:
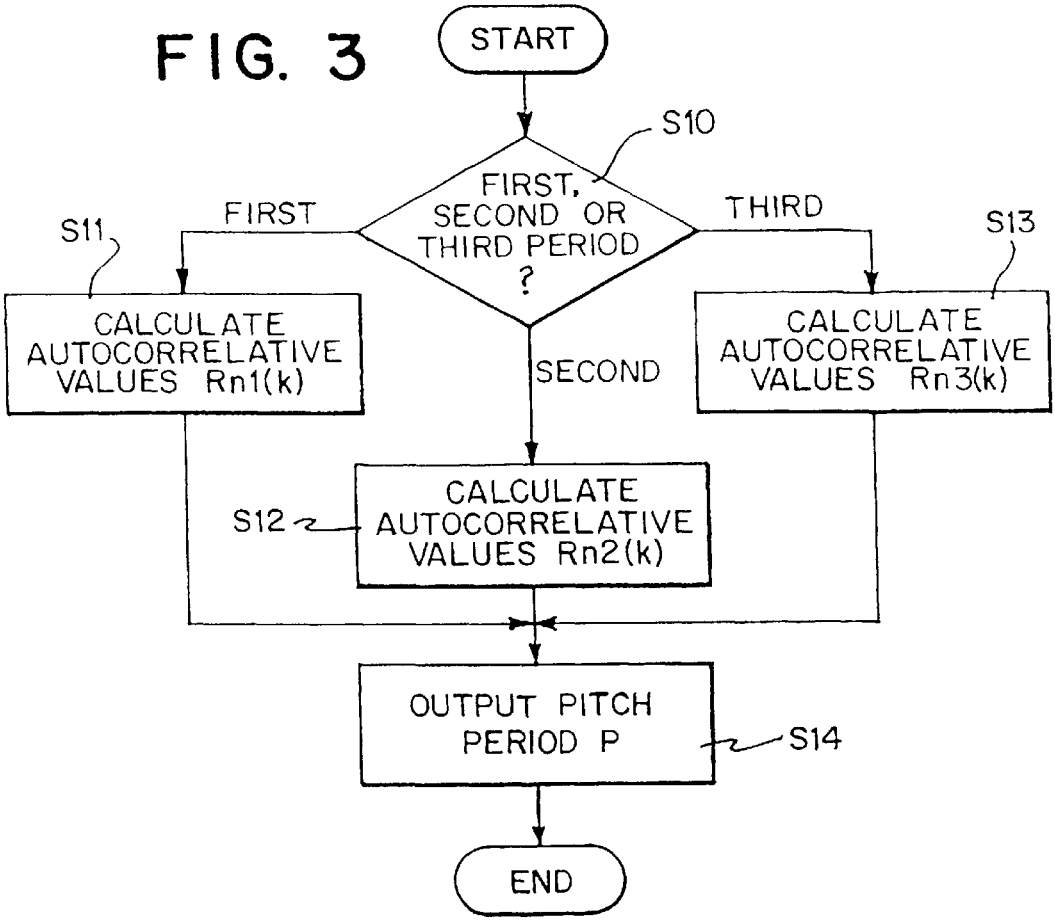
FIG. 3 is a flowchart showing an operation of a second embodiment.

With referring to FIG. 3, in a first step 510, the microcomputer 18 determines the plurality of periods within the range of the delay times k according to the data of the sampling frequency fs of the A/D converter 14. On the assumption that a pitch period of the speech is 80 –400 Hz as described above, the microcomputer 18 determines a range of 20 samples≦k≦100 samples as similar to FIG. 2 embodiment as the range of the delay times k when the sampling frequency fs is 8 kHz. Then, the microcomputer 18 divides the range into three periods, for example. A range of 20 samples≦k<40 samples, a range of 40 samples≦k <80 samples, and a range of 80 samples≦k≦100 samples are respectively set as a first period (a first delay time range), a second period (a second delay time range), and a third period (a third delay time range).

In addition, when the sampling frequency fs is 6 kHz, as similar to FIG. 2 embodiment, a range of 15 samples≦k≦75 samples is determined as the range of the delay times k. Then, the range is divided into three periods, for example. A range of 15 samples≦k<30 samples, a range of 30 samples≦k<60 samples, and a range of 60 samples≦k≦75 samples are respectively set as the first period, the second period, and the third period.

In succeeding steps 511, 512, and 513, the microcomputer 18 calculates the autocorrelative values Rn1(k), Rn2(k), and Rn3(k) according to the following equations (4), (5) and (6).

$$\mathrm{Rn1}(k) = \sum_{m=0}^{T1} x(n+m)\cdot x(n+m+k) \tag{4}$$

$$m = 0, 1, 2, \ldots, T1$$

$$6\ \mathrm{kHz}: T1 \leqq Ts - 29,\ 15 \leqq k < 30$$

$$8\ \mathrm{kHz}: T1 \leqq Ts - 39,\ 20 \leqq k < 40$$

$$\mathrm{Rn2}(k) = \sum_{m=0}^{T2} x(n+m)\cdot x(n+m+k) \tag{5}$$

$$m = 0, 1, 2, \ldots, T2$$

$$6\ \mathrm{kHz}: T2 \leqq Ts - 59,\ 30 \leqq k < 60$$

$$8\ \mathrm{kHz}: T2 \leqq Ts - 79,\ 40 \leqq k < 80$$

-continued $$\mathrm{Rn3}(k) = \sum_{m=0}^{T3} x(n+m)\cdot x(n+m+k) \tag{6}$$

$$m = 0, 1, 2, \ldots, T3$$

$$6\ \mathrm{kHz}: T3 \leqq Ts - 75,\ 60 \leqq k < 75$$

$$8\ \mathrm{kHz}: T3 \leqq Ts - 100,\ 80 \leqq k < 100$$

In the previous steps 511, 512 and 513, the microcomputer 18 determines the respective product sum period T1, T2 and T3 of the equations (4), (5) and (6).

Thereafter, in a step 514, the microcomputer 18 evaluates a maximum value out of the autocorrelative values Rn1(k), Rn2(k) and Rn3(k) calculated in the previous step S11, S12 and S13, and outputs a delay time k at which the maximum value is obtainable as a pitch period P of the input speech signal.

In this embodiment shown, it is noted that a possibility that the double a true pitch period is erroneously recognized as a pitch period is made small by applying small weights to the autocorrelative values having long periods, and therefore, the true pitch period can be extracted. However, in such a case, as different from the first method of the prior art, the autocorrelative values of each of the respective periods are not weighted with the different weights. That is, the autocorrelative values in each of the periods are weighted with the same weight. The reason is that in this embodiment shown, the end values are determined such that the end values of the respective periods do not include values twice the starting values, and therefore, there is no component of double period in each of the respective periods.

However, in FIG. 3 embodiment, if the microcomputer 18 determines the product sum ranges T1, T2 and T3 of the equations (4), (5) and (6) according to a relationship of T1>T2>T3, resultingly, small weights are applied to the autocorrelative values having long periods, and therefore, it is possible to evaluate a correct pitch period.

Furthermore, if an end value of the product sum range in calculating the autocorrelative values is set at a possible maximum value in each of the periods, the accuracy of the pitch period can be increased, More specifically, in the above described example, if the sampling frequency is 6 kHz, the product sum ranges T1, T2 and T3 may be set as T1=Ts−29, T2=Ts−59, T3=Ts−75, and in a case of 8 kHz, T1=Ts−39, T2=Ts−79 and T3=Ts−100 may be set.

Figure 4:
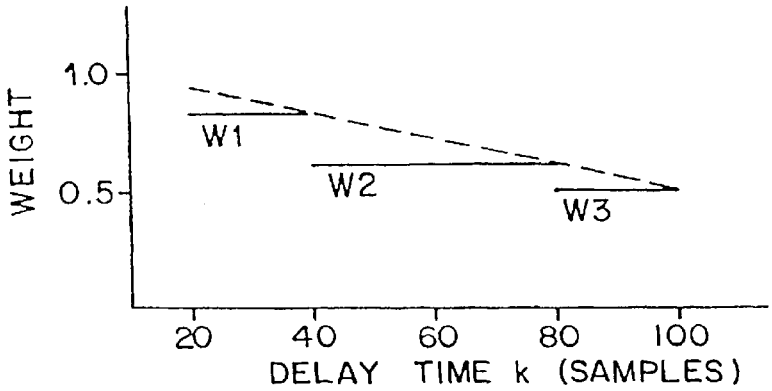
FIG. 4 is a graph showing a relationship between a pitch period and weights for autocorrelation values in the second embodiment.

As similar to FIG. 6, a ratio of the delay times (samples) and the weights for the autocorrelative values in FIG. 3 embodiment is shown in FIG. 4. A solid line indicates the embodiment, and a dotted line indicates the first method of the prior art. As shown in FIG. 4, in FIG. 3 embodiment, in each of the periods in which a component of a double period is not included, the autocorrelative values are evenly weighted. In addition, as mentioned in the above, product sum ranges T1, T2 and T3 are set in accordance with the relationship of T1>T2>T3, and therefore, the autocorrelative values Rn1(k), Rn2(k) and Rn3(k) are weighted with weighting efficiencies W1, W2 and W3, respectively.

FIG. 5 is a flowchart showing a third embodiment in which the FIG. 2 embodiment (a first embodiment) and FIG. 3 embodiment (a second embodiment) are simultaneously included. In a step 520 of FIG. 5, the microcomputer 18 sets a sampling frequency fs of the A/D converter 14, that is, 8 kHz or 6 kHz. The A/D converter 14 converts the analog speech signal into the speech signal data x(n) with the sampling frequency fs thus set. In a next step 521, the microcomputer 18 determines the respective periods within the range of the delay times k with referring to the data of the sampling frequency fs in the step 51. That is, when the sampling frequency fs is 8 kHz, a range of 20 samples≦k<40 samples, a range of 40 samples≦k<80 samples, and a range of 80 samples≦k≦100 samples are set as the first period, the second period, and the third period. In addition, if the sampling frequency fs is 6 kHz, a range of 15 samples≦k <30 samples, a range of 30 samples≦k<60 samples, and a range of 60 samples≦k≦75 samples are set as the first period, the second period, and the third period.

Thereafter, in steps 522, 523, and 524, the autocorrelative values Rn1(k), Rn2(k) and Rn3(k) are calculated for each of the periods according to the aforementioned equations (4), (5) and (6) with the product sum ranges T1, T2 and T3. In a lost step 525, the microcomputer 18 evaluates a maximum value out of the autocorrelative values, and outputs a delay time k at which the maximum value is obtainable as a pitch period of the speech signal.

In addition, in the above described embodiments, a case where the sampling frequency fs is 8 kHz or 6 kHz is described. However, a value of the sampling frequency fs is not limited thereto. Furthermore, the range of the delay times k are determined as 15≦k≦75 (6 kHz) or 20≦k≦100 (8 kHz). However, an arbitrary range of delay time may be set. Furthermore, although the range of delay time is divided into three periods; however, the number of the periods may be an arbitrary value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pitch period extracting apparatus of a speech signal, comprising:

an A/D converter for converting a speech signal into speech signal data at a sampling frequency;

a memory for storing the speech signal data outputted from said A/D converter:

an autocorrelative value calculating means for calculating autocorrelative values of the speech signal data stored in said memory on the basis of delay time[s] of the speech signal data;

a delay time range determining means for determining a range of said delay time[s] according to said sampling frequency, a period setting means for setting a plurality of [delay time ranges] *periods* in the range of the delay time[s] determined by said delay time range determining means;

a product sum range control means for controlling [a] product sum range*s* in calculating the autocorrelative values for each of said plurality of [delay time ranges] *periods* such that the product sum ranges of said plurality of [delay time ranges] *periods* are different from each other; and a pitch period detecting means for detecting a pitch period of said speech signal by evaluating a maximum autocorrelative value out of said autocorrelative values in [each of respective delay time ranges] *all of the periods*.

2. A pitch period extracting apparatus according to claim 1, wherein said product sum range control means determines the product sum ranges according to the pitch period to be evaluated.

3. A pitch period extracting apparatus according to claim 2, wherein said product sum range control means makes the product sum ranges narrower for the [delay time ranges] *periods* in which *a* longer pitch period[s are] *is* evaluated.

4. A pitch period extracting apparatus according to claim 3, wherein said product sum range control means sets said product sum range to have [an end value] *different maximum values* in each of the plurality of different [delay time ranges so it is equal to a different maximum value] *periods*.

5. A pitch period extracting apparatus of a speech signal, comprising:

an A/D converter for converting a speech signal into speech signal data [with] *at* a sampling frequency;

a memory for storing the speech signal data outputted from said A/D converter;

an autocorrelative value calculating means for calculating autocorrelative values of the speech signal data stored in said memory on the basis of delay time[s] of the speech signal data;

a delay time range determining means for determining a range of said delay time[s] according to said sampling frequency;

a period setting means for setting a plurality of periods in the range of the delay time[s] determined by said delay time range determining means;

a product sum range[s] control means for controlling product sum range in calculating the autocorrelative values for each of said plurality of periods such that the product sum ranges of said plurality of periods are different from each other; and a pitch period detecting means for detecting a pitch period of said speech signal by evaluating a maximum autocorrelative value out of said autocorrelative values in [each of respective] *all of the* periods wherein said period setting means sets a starting value and an end value of each of the plurality of periods in a manner that the end value [does not include] *is less than* double the starting value.

6. A pitch period extracting apparatus according to claim [2] *5*, wherein said product sum range control means sets said product sum range*s* to have [an end value] *different maximum values* in each of the plurality of different [delay time ranges so it is equal to a different maximum value] *periods*.

7. A pitch period extracting apparatus according to claim 1, wherein said product sum range control means sets said product sum range*s* to have [an end value of the product sum range] *different maximum values* in each of the plurality of different [delay time ranges so it in equal to a different maximum value] *periods*.

8. A pitch period extracting apparatus according to claim 2, wherein said period setting means sets a starting value and an [and] *end* value of each of the plurality of [delay time ranges] *periods* in a manner [such] that the end value [does not include] *is less than* double the starting value.

9. A pitch period extracting apparatus according to claim 1, wherein said period setting means sets a starting value and an end value of each of the plurality of [delay time ranges] *periods* in a manner [such] that the end value [does not include] *is less than* double the starting value.

10. A pitch period extracting apparatus of a speech signal, comprising:

an A/D converter for converting a speech signal into speech signal data at a sampling frequency;

a memory for storing the speech signal data outputted from said A/D converter;

an autocorrelative value calculating means for calculating autocorrelative values of the speech signal data stored in said memory on the basis of delay time[s] of the speech signal data;

a period setting means for setting a plurality of [delay time ranges] *periods* in [a] *the* range of the delay time[s];

a product sum range control means for controlling [a] product sum range*s* in calculating the autocorrelative value*s* for each of said plurality of [delay time ranges] *periods* such that the product sum ranges of said plurality of [delay time ranges] *periods* are different from each other; and a pitch period detecting means for detecting a pitch period of said speech signal by evaluating a maximum autocorrelative value out of said autocorrelative values in [each of respective delay time ranges] *all of the periods*.

11. A pitch period extracting apparatus according to claim 10, wherein said product sum range control means determines the product sum ranges according to the pitch period to be evaluated.

12. A pitch period extracting apparatus according to claim 11, wherein said product sum range control means makes the product sum ranges narrower for the [delay time ranges] *periods* in which *a* longer pitch period[s are] *is* evaluated.

13. A pitch period extracting apparatus according to claim 10, wherein said product sum range control means sets said product sum range*s* to have [an end value] *different maximum values* in each of the plurality of different [delay time ranges it is equal to a different maximum value] *periods*.

14. A pitch period extracting apparatus of a speech signal according to claim 10, wherein said period [getting] *setting* means sets a starting value and an [and] *end* value of each of the plurality of [delay time ranges] in a manner that the end value [does not include] *is less than* double the starting value.

15. A pitch period extracting apparatus according to claim 11, wherein said product sum range control means sets said product sum range*s* to have [an end value] *different maximum values* in each of the plurality of different [delay time ranges so it is equal to a different maximum value] *periods*.

16. A pitch period extracting apparatus according to claim 10, wherein said product sum range control means sets said product sum range*s* to have [an end value] *different maximum values* of the product sum range in each of the plurality of different [delay time ranges so it is equal to a different maximum value] *periods*.

17. A pitch period extracting apparatus according to claim 11, wherein said period setting means sets a starting value and an end value of each of the plurality of [delay time ranges] *periods* in a manner [such] that the end value [does not include] *is less than* double the starting value.

18. A pitch period extracting apparatus according to claim 10, wherein said period [netting] *setting* means sets a starting value and an [and] *end* value of each of the plurality of [delay time ranges] *periods* in a manner [such] that the [and] *end* value [does not include] *is less than* double the starting value.

* * * * *